H. E. KERR.
PAIL.
APPLICATION FILED JAN. 25, 1909.
931,315.
Patented Aug. 17, 1909.
2 SHEETS—SHEET 1.
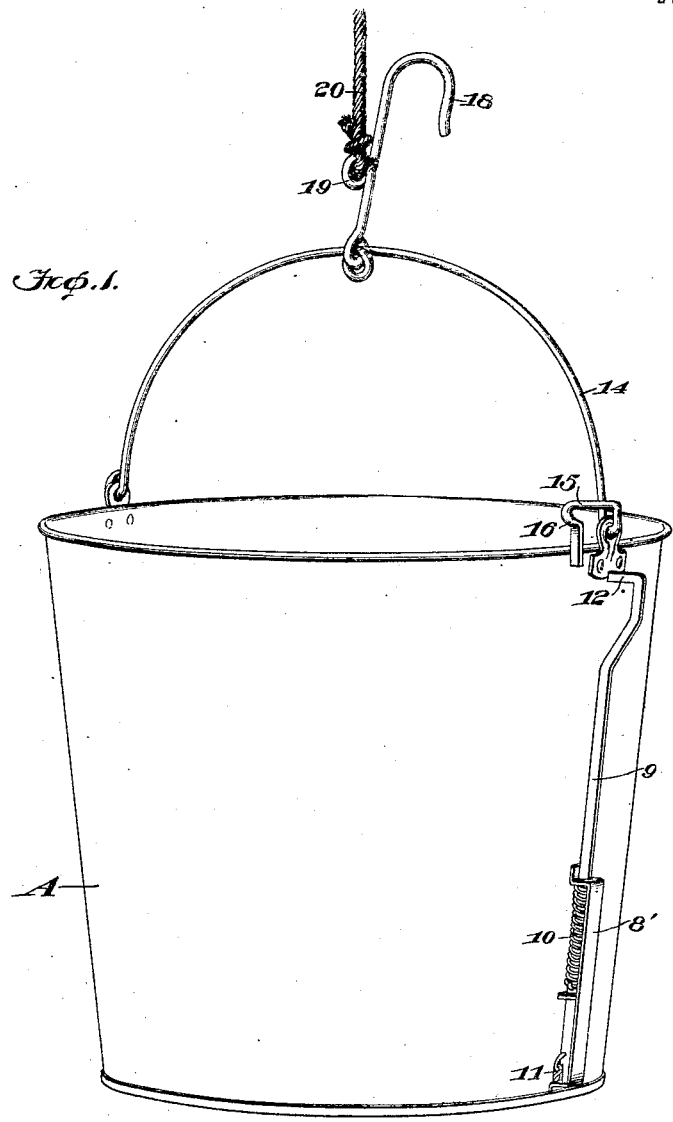
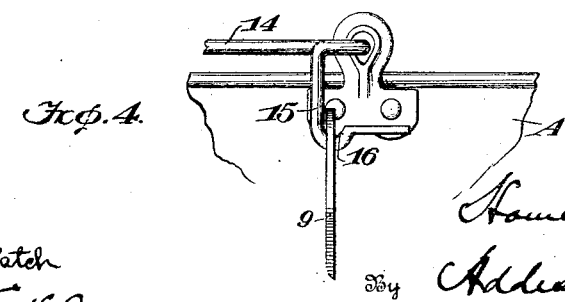
Witnesses
Lloyd W. Patch
Vernon E. Hodges
Inventor
Homer E. Kerr
By Addison G. DuBois
his Attorney

H. E. KERR.
PAIL.
APPLICATION FILED JAN. 25, 1909.

931,315.

Patented Aug. 17, 1909.

2 SHEETS—SHEET 2.

Witnesses
Lloyd W. Patch
Vernon E. Hodges

Inventor
Homer E. Kerr
By Addison G. DuBois
his Attorney

UNITED STATES PATENT OFFICE.

HOMER E. KERR, OF SPRINGVILLE, PENNSYLVANIA.

PAIL.

No. 931,315.　　　Specification of Letters Patent.　　　Patented Aug. 17, 1909.

Application filed January 25, 1909. Serial No. 474,127.

*To all whom it may concern:*

Be it known that I, HOMER E. KERR, a citizen of the United States, residing at Springville, in the county of Susquehanna and State of Pennsylvania, have invented certain new and useful Improvements in Pails, of which the following is a specification.

My invention relates to an improvement in pails, and the object is to provide means whereby the bottom of the pail may be opened to discharge the contents of the pail without the necessity of discharging the contents from the top of the pail.

The pail is adapted to be used more particularly for gathering fruit, nuts, and the like by suspending the pail on a ladder or limb of a tree and lowering it without the necessity of the picker coming to the ground to empty the contents of the pail. The pail is lowered by means of a rope to the ground or to the receptacle to receive the contents of the pail, and the bail of the pail is lowered until it engages certain mechanism which retains the bottom of the pail in position. When the engagement has been made with this mechanism by the bail the rope is drawn taut sufficiently to cause the mechanism to be operated and at the same time raising the pail slightly from the ground or receptacle to permit of the bottom to be released from its position and discharging the contents of the pail onto the ground or into a receptacle.

The invention consists of certain novel features of construction and combinations of parts which will be hereinafter described and pointed out in the claims.

Figure 2:
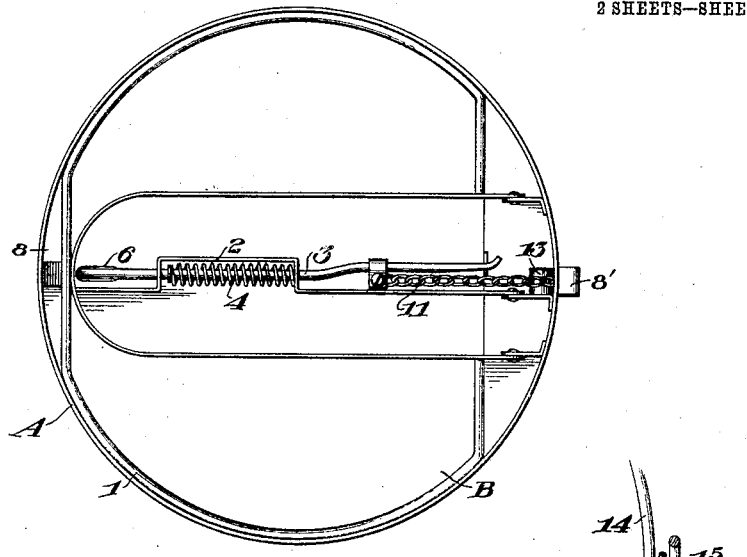
Figure 3:
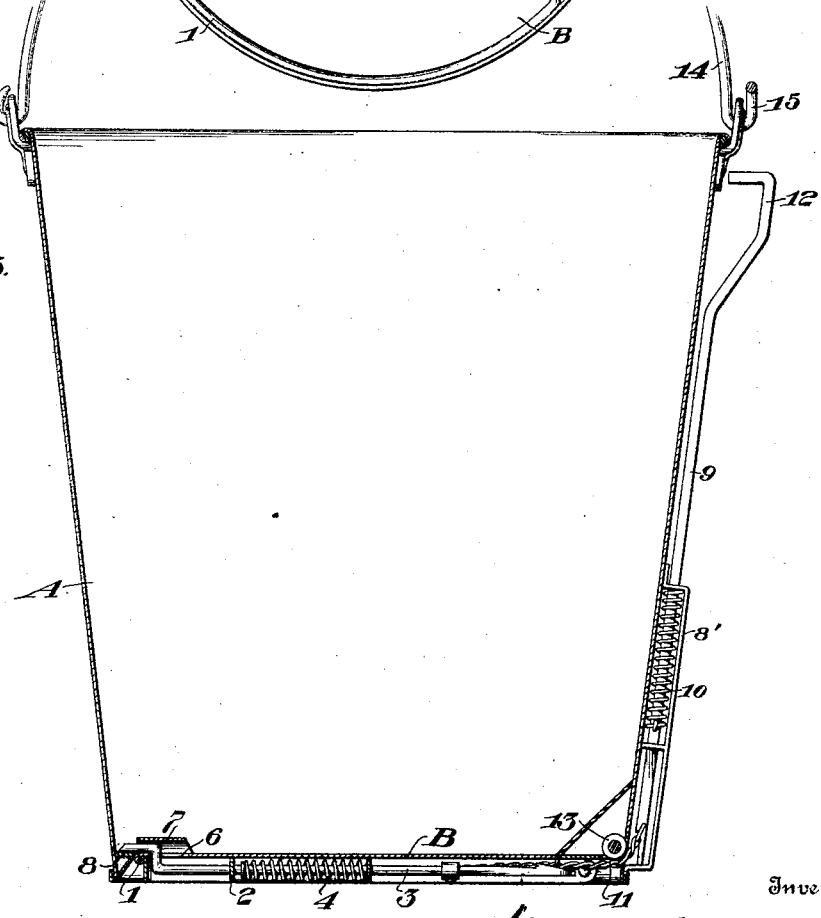

In the accompanying drawings—Figure 1 is a perspective view; Fig. 2 is a bottom plan; Fig. 3 is a longitudinal sectional view; and Fig. 4 is a detail.

A, represents the pail, and B the bottom, which is hinged thereto. A wire 1 is bound around the edge of the bottom to afford the proper strength thereto. A plate 2 is secured to the bottom B and slidably supported in the plate is a latch 3. A spring 4 is connected to the latch, and one end bears against the plate, causing the latch to be drawn forward. The latch extends through the bottom to the upper side thereof through an elongated slot 6, which is covered by a guard 7. The end of the latch extends over a flange 8 formed along the inner wall of the pail for supporting the bottom in position.

A skeleton frame 8' is formed on the outer wall of the pail and mounted in the frame is a bar 9, which has a coil spring 10 connected thereto, and one end of the spring bearing against one end of the frame to retain the bar in its normal or downward position. The bar is connected to the latch 3 by a chain 11, the chain passing over a roller 13 journaled at the lower edge of the pail. The upper end of the bar 9 is formed into a hook 12.

A bail 14 is pivotally connected to the pail in the usual manner. An arm 15 is formed on one end of the bail and is adapted to be received beneath the hook 12 of the bar 9 when in a lowered position. A recess 16 is formed in the arm which is adapted to receive the hook, and as the bail is raised to an upright position it draws the bar 9 upward sufficiently to permit of the latch becoming disengaged from the flange 8, causing the bottom of the pail to swing downwardly, permitting the contents of the pail to be discharged. The hook 12. is disengaged from the arm 15 practically at the same time that the latch is released from the flange 8 and just prior to the pail assuming its upright position.

A hook 18 is connected to the bail for suspending the pail from the ladder or limb of the tree. This hook is provided with a loop 19 to which is attached a rope 20 for raising and lowering the pail.

From the foregoing it will be seen that I have provided a pail for gathering fruit, nuts, and the like which can be emptied by the picker from the tree without the necessity of coming to the ground to empty the contents of the pail. The bottom of the pail being hinged and held in position by a latch for closing the bottom of the pail, it is permitted to swing open upon the operation of the latch by the bail being lowered whereby the arm on the bail comes in contact with the hook which is connected to the latch for raising the hook sufficiently to release the latch from engagement, causing the bottom of the pail to swing downwardly and discharge the contents of the pail.

It is evident that more or less slight changes might be made in the form and arrangement of the several parts described without departing from the spirit and scope of my invention, and hence I do not wish to be limited to the exact construction herein set forth, but:—

Having fully described my invention, what I claim as new and desire to secure by Letters Patent is:—

1. A pail comprising a hinged bottom, a latch for supporting the bottom in position, a bail on the pail, means connected to the latch and adapted to be engaged by the bail for releasing the latch when the bail is drawn to upright position.

2. A pail comprising a hinged bottom, a latch for supporting the bottom in position, a bar, means connecting the bar and latch, a bail adapted to engage the bar for actuating the latch for releasing the bottom of the pail for discharging the contents of the pail.

3. A pail comprising a hinged bottom, a latch for retaining the bottom in closed position, a bar, means connecting the bar and latch, a bail on the pail, an arm on the bail adapted to engage the bar for actuating the latch to release the bottom for discharging the contents of the pail.

In testimony whereof I affix my signature, in the presence of two witnesses.

HOMER E. KERR.

Witnesses:
D. D LATHROP,
J. V. WADE.